(12) United States Patent
Hirota (10) Patent No.: US 9,386,198 B2
(45) Date of Patent: Jul. 5, 2016

(54) IMAGE PICKUP APPARATUS HAVING IMAGING SENSOR PACKAGE

(75) Inventor: Norikazu Hirota, Chigasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 13/616,755

(22) Filed: Sep. 14, 2012

(65) Prior Publication Data

US 2013/0076977 A1 Mar. 28, 2013

(30) Foreign Application Priority Data

Sep. 22, 2011 (JP) ................................. 2011-207292

(51) Int. Cl.
*H04N 5/225* (2006.01)

(52) U.S. Cl.
CPC .................................. *H04N 5/2253* (2013.01)

(58) Field of Classification Search
USPC ......................................................... 348/374
See application file for complete search history.

(56) References Cited

U.S. PATENT DOCUMENTS

| 5,079,635 | A | 1/1992 | Koshiyouji et al. |
| 8,106,952 | B2 | 1/2012 | Yoshida et al. |
| 8,248,524 | B2 | 8/2012 | Chen |
| 2008/0292308 | A1 | 11/2008 | Iwabuchi |
| 2009/0046184 | A1 | 2/2009 | Ma et al. |
| 2009/0153684 | A1* | 6/2009 | Yoshida et al. ........... 348/208.99 |
| 2011/0051374 | A1* | 3/2011 | Chen .............................. 361/709 |
| 2012/0169920 | A1* | 7/2012 | Mukai ........................... 348/373 |

FOREIGN PATENT DOCUMENTS

| CN | 101369592 A | 2/2009 |
| CN | 101459167 A | 6/2009 |
| CN | 102006401 A | 4/2011 |
| EP | 1337106 A1 | 8/2003 |
| JP | 05-292380 A | 11/1993 |
| JP | 2008139593 A | 6/2008 |
| JP | 2009147685 A | 7/2009 |
| JP | 2011040861 A | 2/2011 |
| TW | 201110675 A | 3/2011 |
| WO | 2011033929 A1 | 3/2011 |

OTHER PUBLICATIONS

Extended European Search Report issued Jan. 4, 2013 for corresponding EP12184001.1.

(Continued)

*Primary Examiner* — Roberto Velez
*Assistant Examiner* — Stephen Coleman
(74) *Attorney, Agent, or Firm* — Rossi, Kimms & McDowell LLP (57) ABSTRACT

An image pickup apparatus in which an imaging sensor package reflow mounted in advance to a circuit board can be fixed to a fixture member of the image pickup apparatus. A sensor holder of a digital video camera as an image pickup apparatus has a holder body that is positioned to surround an imaging sensor package mounted to a sensor board as a circuit board. Flange portions of the sensor holder are formed to project from a rear end surface of the holder body toward a heat radiation plate having a flat plate shape. The heat radiation plate is fixed to a lens barrel in a state that the flange portions are held between the lens barrel and the heat radiation plate.

7 Claims, 5 Drawing Sheets

(56) References Cited

OTHER PUBLICATIONS

Office Action issued in corresponding Chinese Patent Application No. 201210337071.1, dated Dec. 3, 2014. English translation provided. Some references cited in Office Action and English equivalents thereof have been previously cited.

Taiwanese Office Action issued in Taiwanese counterpart application No. TW101130103, dated Jul. 3, 2015. English translation provided.

Chinese Office Action issued in Chinese counterpart application No. CN201210337071.1, dated Aug. 13, 2015. English translation provided.

Japanese Office Action issued in Japanese counterpart application No. JP2011207292, dated Aug. 18, 2015.

Japanese Office Action issued in Japanese counterpart application No. JP2011207292, dated Aug. 18, 2015. English translation provided.

* cited by examiner

FIG.6

IMAGE PICKUP APPARATUS HAVING IMAGING SENSOR PACKAGE

BACKGROUND OF THE INVENTION

1. Field of the Invention

The present invention relates to an image pickup apparatus provided with an imaging sensor package.

2. Description of the Related Art

There has been proposed an image pickup apparatus (e.g. a video camera) that has a lens barrel configured to be mounted with an imaging sensor package that is attached in advance to a fixture member such as a flat plate-like sensor holder (see, Japanese Laid-open Patent Publication No. H5-292380).

In general, the imaging sensor package is adhered by adhesive to the sensor holder. However, a problem is posed that the sensor package adhered by adhesive to the sensor holder is peeled off from the sensor holder when the sensor package is mounted to a circuit board by a method where the sensor package adhered to the sensor holder is placed on the circuit board with solder paste and then passed through a reflow furnace together with the circuit board.

Accordingly, it is known to configure the imaging sensor package into a so-called SOP (Small Outline Package) structure in which terminals are exposed to side surfaces of the package, so that these terminals can be soldered to a circuit board with a soldering iron. However, the imaging sensor package of SOP structure has a disadvantage that a mounting area thereof increases with increase of the number of the terminals.

In recent years, most of imaging sensor packages are configured into a so-called BGA (Ball Grid Array) structure or a so-called LGA (Land Grid Array) structure, in which terminals are arranged in matrix on a rear surface of the sensor package. The imaging sensor package of BGA or LGA structure is usually reflow mounted to a circuit board. When such a sensor package is adhered by adhesive to a sensor holder and reflow mounted to a circuit board, however, there occurs the aforementioned problem that the sensor package is peeled off from the sensor holder.

To mount the sensor holder to the lens barrel, screws are generally used and screw holes are formed in the sensor holder for thread engagement with these screws. In the case of the sensor holder that has a flat plate shape, projections for formation of the screw holes that project from the sensor holder toward an object in an optical axis direction must sometimes be provided in the sensor holder to ensure the required depth of the screw holes. In that case, actuators and shafts in the lens barrel must be disposed outward of the projections of the sensor holder, and the resultant lens barrel becomes large in size.

SUMMARY OF THE INVENTION

The present invention provides an image pickup apparatus in which an imaging sensor package reflow mounted in advance to a circuit board can be fixed to a fixture member of the image pickup apparatus.

According to one aspect of this invention, there is provided an image pickup apparatus comprising an imaging sensor package, a circuit board configured to be mounted with the imaging sensor package, a heat radiation plate disposed on a side of the circuit board opposite from a side thereof on which the imaging sensor package is mounted, a holder member having a holder body thereof configured to be positioned relative to the imaging sensor package to surround the imaging sensor package mounted to the circuit board and having flange portions thereof formed integrally with the holder body, and a fixture member configured to be fixed with the holder member and the heat radiation plate, wherein the flange portions of the holder member project from a rear end surface of the holder body of the holder member toward the heat radiation plate, and the heat radiation plate has a flat plate shape and is fixed to the fixture member in a state that the flange portions are held between the fixture member and the heat radiation plate.

With this invention, the imaging sensor package reflow mounted in advance to the circuit board can be fixed to the fixture member of the image pickup apparatus.

Further features of the present invention will become apparent from the following description of an exemplary embodiment with reference to the attached drawings.

DESCRIPTION OF THE EMBODIMENTS

The present invention will now be described in detail below with reference to the drawings showing a preferred embodiment thereof.

Figure 1A:
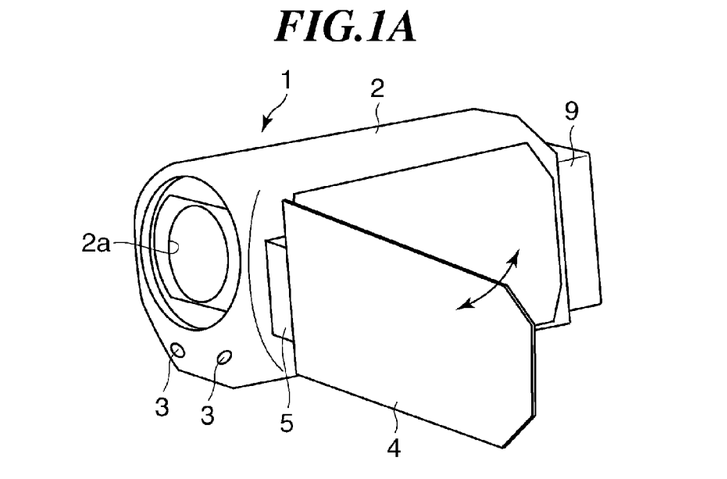
FIG. 1A is an external perspective view of a digital video camera, which is an example of an image pickup apparatus according to one embodiment of this invention.
Figure 1B:
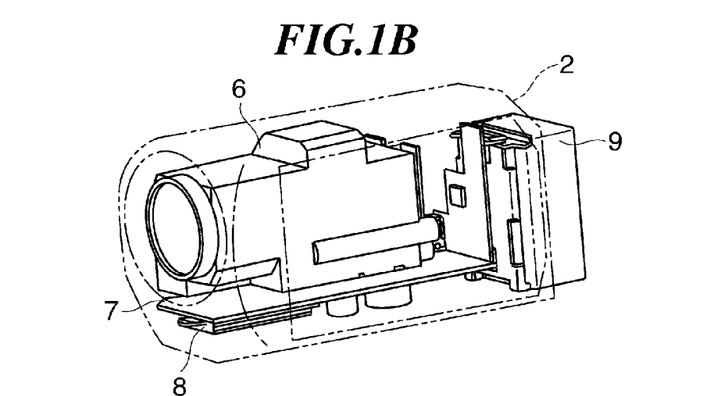
FIG. 1B is a perspective view showing the internal construction of the digital video camera.
Figure 1C:
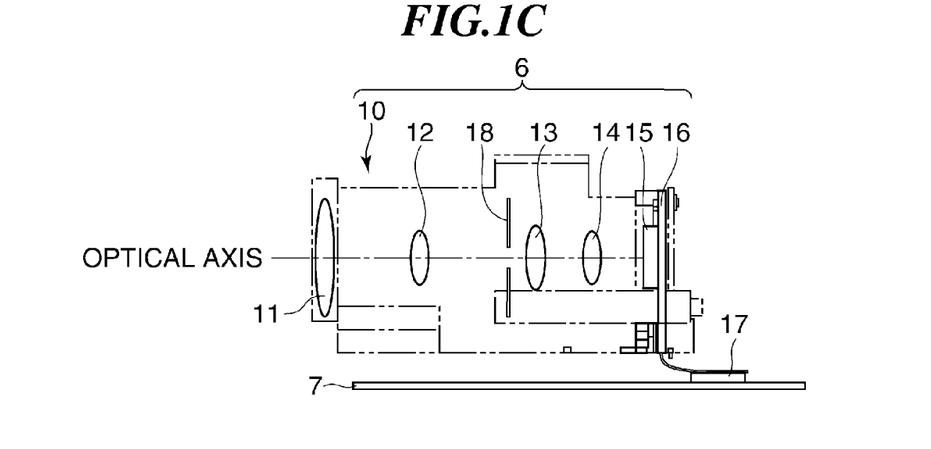
FIG. 1C is a schematic view showing the construction of a camera unit that constitutes an imaging optical system of the digital video camera.

FIGS. 1A to 1C each show a digital video camera, which is an example of an image pickup apparatus according to one embodiment of this invention.

In FIG. 1A, reference numeral 1 denotes the digital video camera that has a camera body 2 formed at its front surface with a camera body opening 2a. The camera 1 includes microphones 3 for inputting sounds, a display unit 4 for displaying an object image, and a battery 9, which are provided at the front surface, left side surface, and rear surface of the camera body 2, respectively. The display unit 4 is attached to the camera body 2 via a hinge 5 so as to be openable/closable and rotatable relative to the camera body 2.

As shown in FIG. 1B, a camera unit 6 is incorporated in the camera body 2. A main board 7 mounted with a signal processing unit (not shown) and the like is disposed downward of the camera unit 6, and a recording unit board 8 mounted with a recording unit such as a nonvolatile memory is disposed downward of the main board 7. It should be noted that signal processing by the video camera 1 does not directly relate to the gist of this invention, and therefore a description thereof is omitted herein.

As shown in FIG. 1C, the camera unit 6 includes a lens barrel 10, an imaging sensor package 15, and a sensor board 16 serving as a circuit board on which the sensor package 15 is mounted. The lens barrel 10 is e.g. an inner focus zoom lens barrel, and includes an imaging optical system that is mainly comprised of first to fourth group lenses 11-14 and a diaphragm 18. The first and third group lenses 11, 13 are fixedly disposed in the lens barrel 10, the second group lens 12 is zoom driven by e.g. a motor (not shown) in a direction of an optical axis of the imaging optical system, and the fourth group lens 14 is focus driven by e.g. a motor (not shown) in the optical axis direction.

The imaging sensor package 15 incorporates an image sensing device (denoted by reference numeral 36 in FIGS. 3A and 3B) such as a CMOS or a CCD. The details of construction of the imaging sensor package 15 will be described later.

An object image incident through the camera body opening 2a is formed on and photoelectrically converted into analog image information by the image sensing device 36 of the imaging sensor package 15. The analog image information is converted into digital image information by the signal processing unit (not shown) mounted on the sensor board 16, and the digital image information is transmitted via a connection device 17 to a signal processing unit (not shown) mounted on the main board 7. The image information received and processed by the signal processing unit is recorded into the nonvolatile memory mounted on the recording unit board 8, and is displayed by the display unit 4.

Figure 2A:
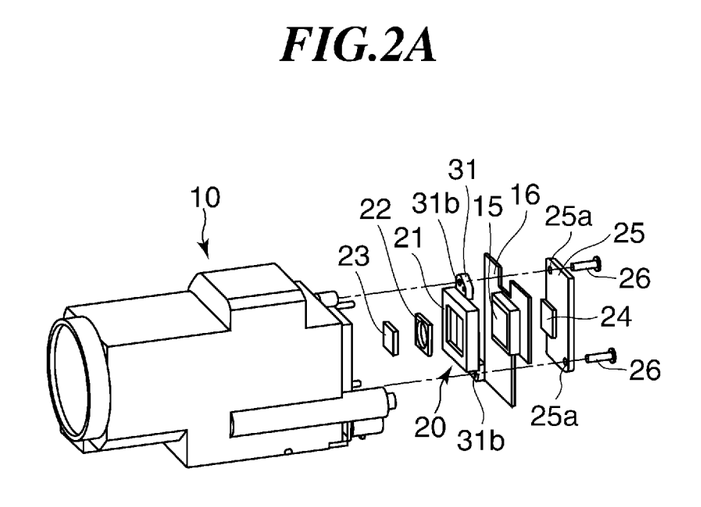
FIG. 2A is an exploded perspective view showing an imaging sensor package mounted to a lens barrel of the digital video camera, together with its peripheral structure.
Figure 2B:
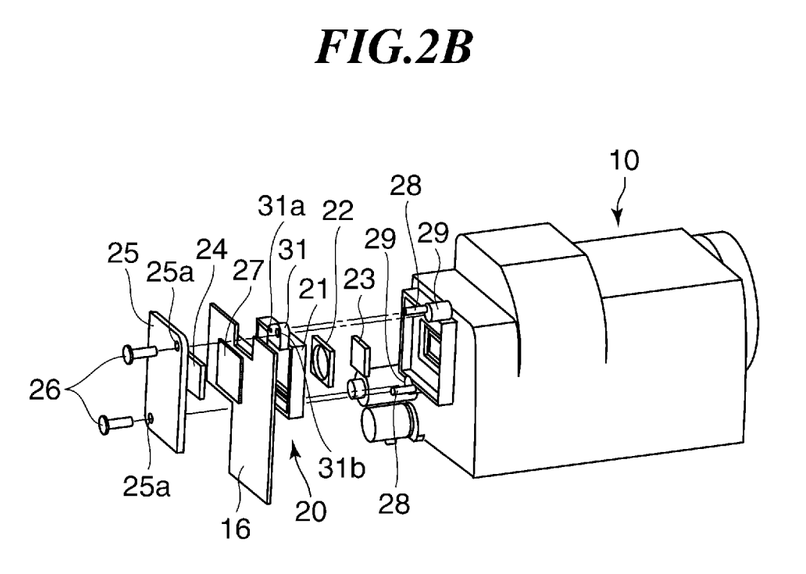
FIG. 2B is another exploded perspective view showing the imaging sensor package and its peripheral structure.

FIGS. 2A and 2B each show in exploded perspective view the imaging sensor package 15 mounted to the lens barrel 10, together with its peripheral structure.

As shown in FIGS. 2A and 2B, an infrared light absorption filter 23, square presser rubber ring 22, sensor holder 20, imaging sensor package 15, sensor board 16, heat radiation rubber plate 24, and heat radiation plate 25 are attached in this order to the lens barrel 10 by means of fastening screws 26, as described below.

The imaging sensor package 15 reflow mounted in advance to the sensor board 16 is positioned and adhered by adhesive to the sensor holder 20 as described later, whereby the imaging sensor package 15, sensor board 16, and sensor holder 20 are assembled into one unit.

Next, the infrared light absorption filter 23 is disposed in a recess formed in a rear surface of the lens barrel 10. Then, the square presser rubber ring 22 is disposed in contact with a rear surface of the infrared light absorption filter 23, and the assembled unit of the sensor holder 20, imaging sensor package 15, and sensor board 16 is disposed in contact with a rear surface of the rubber ring 22. Next, the heat radiation rubber plate 24 is disposed in contact with a signal processing IC 27 mounted on the sensor board 16. The heat radiation rubber plate 24 is made from a compressible material having relatively large thermal conductivity, such as silicon rubber.

Next, positioning holes 31a formed in flange portions (each denoted by reference numeral 31 in FIG. 3A) of the sensor holder 20 are fitted onto positioning bosses 28 formed on the rear surface of the lens barrel 10, whereby the sensor holder 20 is positioned relative to the lens barrel 10. In this state, the fastening screws 26 are inserted through screw insertion holes 25a formed in the heat radiation plate 25 in the optical axis direction and through screw insertion holes 31b formed in the flange portions 31 of the sensor holder 20 in the optical axis direction, and are engaged with threaded screw holes 29a formed in rear surface projections 29 of the lens barrel 10 in the optical axis direction and in alignment with the screw insertion holes 25a and 31b, whereby the infrared light absorption filter 23, the rubber ring 22, the assembled unit (comprised of the sensor holder 20, imaging sensor package 15, and sensor board 16), the heat radiation rubber plate 24, and the heat radiation plate 25 are fixed to the lens barrel 10.

Thus, the heat radiation plate 25 is disposed on a surface of the sensor board 16 opposite from its surface on which the imaging sensor package 15 is mounted. The lens barrel 10 serves as a fixture member of the camera 1 (image pickup apparatus) to which the sensor holder 20 (holder member) and the heat radiation plate 25 are fixed.

The signal processing IC 27 and the heat radiation plate 25 are thermally connected with each other via the heat radiation rubber plate 24. Alternatively, the imaging sensor package 15 and the heat radiation plate 25 can be thermally connected with each other via the heat radiation rubber plate 24 by disposing the rubber plate 24 in a through hole (not shown), which can be formed at a central portion of the sensor board 16.

The imaging sensor package 15 must be attached to the lens barrel 10 in such a manner that an effective pixel range of the imaging sensor package 15 falls within an effective image circle of the lens barrel 10. To this end, in the present embodiment, the sensor holder 20 and the imaging sensor package 15 are positioned and adhered together as described later, whereby a positional relation between the lens barrel 10 and the imaging sensor package 15 can properly be decided via the sensor holder 20.

Figure 3A:
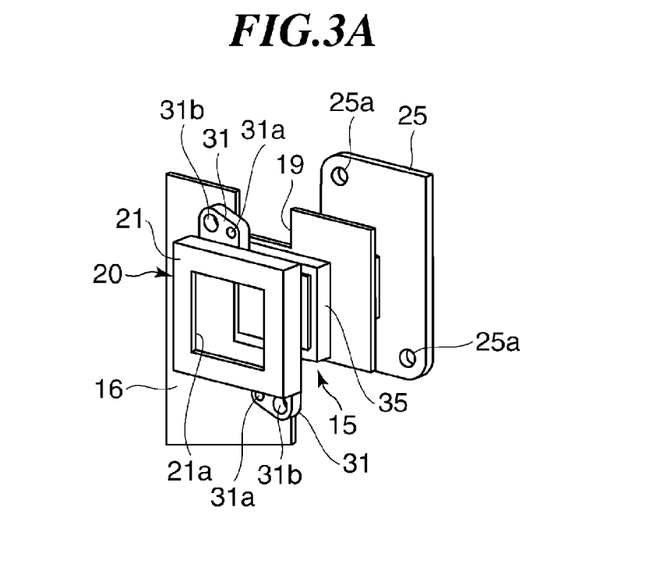
FIG. 3A is an exploded perspective view showing a sensor holder adhered with the imaging sensor package, together with its peripheral structure.
Figure 3B:
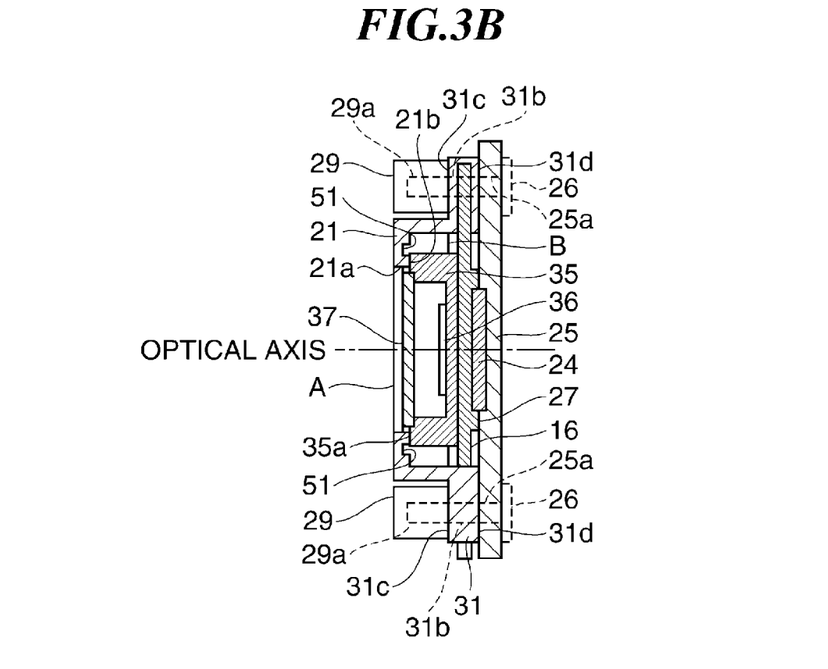
FIG. 3B is a section view showing the sensor holder and its peripheral structure.

FIGS. 3A and 3B show the sensor holder 20 and its peripheral structure in exploded perspective view and in section view, respectively. It should be noted that the front and rear surfaces of the camera body 2 are respectively on the left and right sides in FIG. 3B.

The imaging sensor package 15 includes a box-like frame 35 made from e.g. plastic or ceramic and having a square peripheral wall and a bottom wall integral therewith, and also includes an image sensing device 36 disposed on an inner surface of the bottom wall of the frame 35 and a protection glass plate 37 of a rectangular shape that covers an front open surface of the frame 35. The protection glass plate 37 is supported at its outer edge on a stepped portion of a front surface 35a of the square peripheral wall of the frame 35.

The sensor holder 20 includes a sensor holder body 21 formed into a square frame-like shape that surrounds the imaging sensor package 15, and also includes flange portions formed integrally with the sensor holder body 21 (two flange portions 31 in this embodiment that extend outwardly from upper and lower surfaces of the sensor holder body 21). The sensor holder body 21 has a peripheral wall that surrounds the imaging sensor package 15, and a front wall formed integrally with the peripheral wall. The front wall is formed with an opening 21a into which the protection glass plate 37 is loosely fitted, and has a rear surface 21b disposed in contact with the front surface 35a of the box-like frame 35. The front surface 35a extends nearly parallel to the front surface of the image sensing device 36.

Between the sensor holder body 21 and the sensor board 16, there is provided a predetermined gap corresponding to a liftoff of the imaging sensor package 15 from the sensor board 16 due to soldering, so that the sensor holder body 21 and the sensor board 16 are not in direct contact with each other, whereby the rear surface 21b of the front wall of the sensor holder body 21 and the front surface 35a of the box-like frame 35 can be brought into reliable contact with each other.

The flange portions 31 of the sensor holder 20 project from a rear end surface B of the sensor holder body 21 toward the heat radiation plate 25. In other words, the flange portions 31 project rearwardly of the rear end surface B of the sensor holder body 21. The flange portions 31 are formed with positioning holes 31a and screw insertion holes 31b. The positioning holes 31a are fitted onto the positioning bosses 28 formed on the rear surface of the lens barrel 10 as previously described, thereby positioning the sensor holder 20 relative to the lens barrel 10. As a result, the screw insertion holes 31b of the sensor holder 20 are aligned with the threaded screw holes 29a formed in the rear surface projections 29 of the lens barrel 10.

The flange portions 31 are disposed such that front surfaces 31c thereof are in contact with the rear surface projections 29 of the lens barrel 10. The flange portions 31 extend through notched portions 19 (FIGS. 3A and 4), which are formed at portions of the sensor board 16 that face the flange portions 31, and rear surfaces 31d of the flange portions 31 are in contact with the heat radiation plate 25.

As described above, the flange portions 31 projecting from the rear end surface B of the sensor holder body 21 toward the heat radiation plate 25 are in contact at the front surfaces 31c with the rear surface projections 29 of the lens barrel 10. As shown in FIG. 3B, abutment positions between the flange portions 31 of the sensor holder 20 and the rear surface projections 29 of the lens barrel 10 are nearly aligned with the optical axis direction position of the image sensing device 36, and are located rearward of the optical axis direction position of the center of the imaging sensor package 15. Accordingly, areas for formation of the threaded screw holes 29a in the rear surface projections 29 of the lens barrel 10 can be provided within ranges from the front surfaces 31c of the flange portions 31 (which are the abutment surfaces between the flange portions 31 and the barrel projections 29) to the front end surface A of the sensor holder 20 as seen in the optical axis direction, thereby making it unnecessary to form the threaded screw holes 29a of the lens barrel 10 at locations forward of the front end surface A of the sensor holder 20 in the optical axis direction. Accordingly, motors, shafts, etc. in the lens barrel 10 can be disposed close to the optical axis at locations forward of the front end surface A of the sensor holder 20 in the optical axis direction, whereby the size of the lens barrel 10 in a direction perpendicular to the optical axis can be reduced.

A distance between the rear surfaces 31d of the flange portions 31 of the sensor holder 20 that contact with the heat radiation plate 25 and the front wall rear surface 21b of the sensor holder body 21 that contacts with the frame 35 of the imaging sensor package 15 is represented by a sum of a mounting height of the sensor package 15 relative to the sensor board 16, a thickness of the sensor board 16, a mounting height of the signal processing IC 27 relative to the sensor board 16, and a compressed thickness of the heat radiation rubber plate 24. The mounting height of the sensor package 15 relative to the sensor board 16 is represented by a sum of a thickness of frame 35 and a liftoff of the sensor package 15 relative to the sensor board 16 due to soldering. Similarly, the mounting height of the signal processing IC 27 relative to the sensor board 16 is represented by a sum of a thickness of the signal processing IC 27 and a liftoff of the signal processing IC 27 relative to the sensor board 16 due to soldering.

Thus, the rear surfaces 31d of the flange portions 31 of the sensor holder 20 are rearwardly spaced away from the surface of the sensor board 16, on which the signal processing IC 27 is mounted, in the optical axis direction by a distance corresponding to the sum of the mounting height of the signal processing IC 27 relative to the sensor board 16 and the compressed thickness of the heat radiation rubber plate 24. Since the flange portions 31 of the sensor holder 20 are configured and disposed as described above, the flange portions 31 can be abutted at their rear surfaces 31d against the heat radiation plate 25 without forming protrusions in the heat radiation plate 25 and without bending the heat radiation plate 25.

In other words, the heat radiation plate 25 can be formed into a flat plate shape. Accordingly, it becomes unnecessary to bend or draw the heat radiation plate 25, and it becomes possible to fabricate the same in low cost. Furthermore, heat generated by the signal processing IC 27 and by the imaging sensor package 15 can be conveyed via the heat radiation rubber plate 24 to the heat radiation plate 25 from which the heat can be dissipated.

Figure 4:
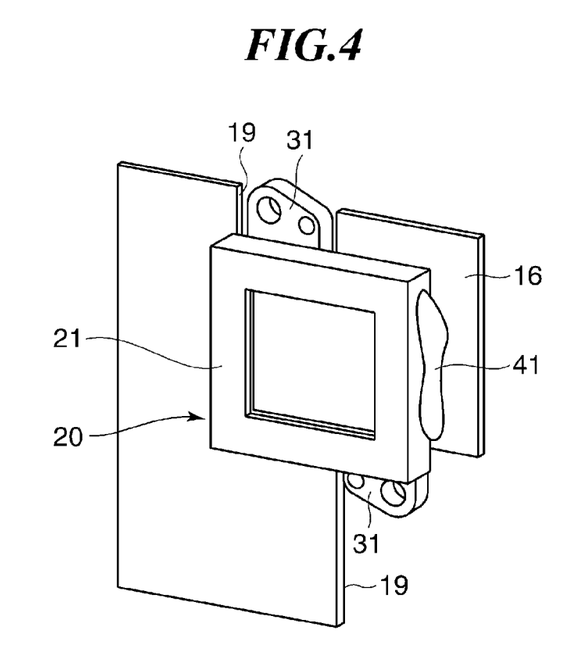
FIG. 4 is a perspective view showing a state where the sensor holder is adhered to a sensor board.
Figure 5:
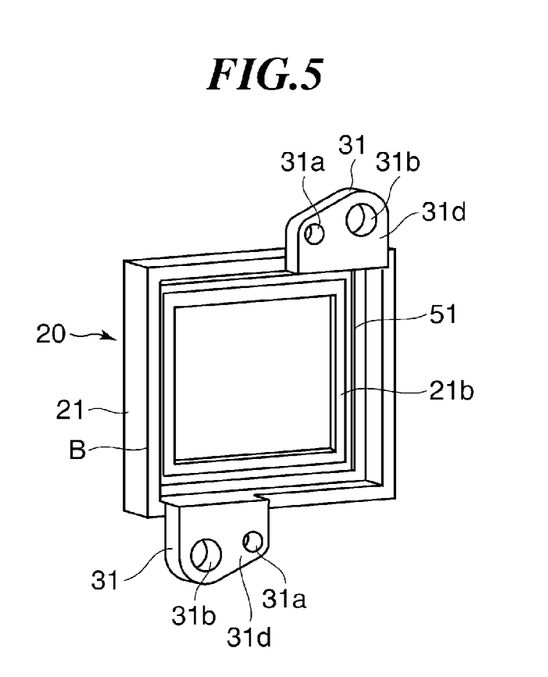
FIG. 5 is a rear perspective view of the sensor holder.

FIG. 4 shows in perspective view a state where the sensor holder 20 is adhered to the sensor board 16, and FIG. 5 shows the sensor holder 20 in rear perspective view. As shown in FIG. 4, adhesive 41 is applied to side surfaces of the sensor holder body 21 and to the surface of the sensor board 16 on which the imaging sensor package 15 is mounted, whereby the sensor holder 20 is adhered and fixed to the sensor board 16.

Since a gap is provided between the sensor holder body 21 and the sensor board 16 as previously described, there is a fear that the adhesive 41 flows into the inside of the sensor holder body 21 through the gap. In this embodiment, as shown in FIGS. 3B and 5, a groove 51 is therefore formed in the front wall rear surface 21b of the sensor holder body 21 at locations outward of the peripheral wall of the frame 35 of the imaging sensor package 15. As a result, even if the adhesive 41 flows into the inside of the sensor holder body 21, the adhesive 41 is guided into the groove 51 and prevented from adhering to the protection glass plate 37 of the sensor package 15.

Figure 6:
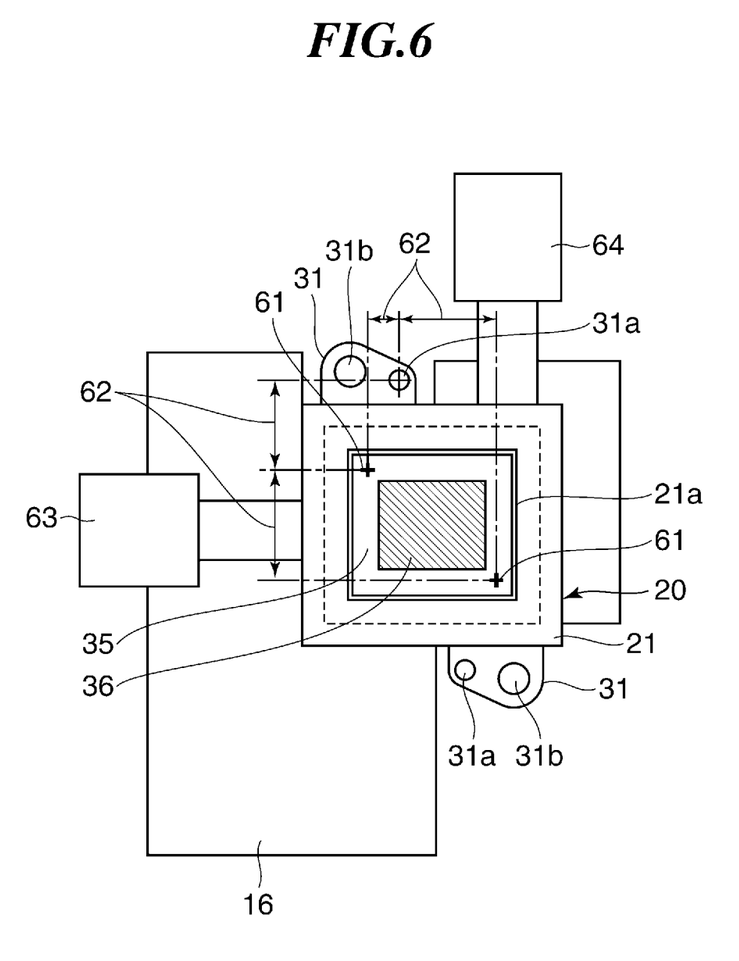
FIG. 6 is a schematic view showing a method for positioning and adhering together the sensor holder and the imaging sensor package.

FIG. 6 schematically shows a method for positioning and adhering together the sensor holder 20 and the imaging sensor package 15.

As shown in FIG. 6, indexes 61 are provided on the bottom wall of the frame 35 of the imaging sensor package 15 at locations on the upper left and lower right of the image sensing device 36 of the sensor package 15 as seen from front. The opening 21a of the sensor holder body 21 is formed in such a manner that the indexes 61 are visible therethrough.

A worker aligns the position of the imaging sensor package 15 with the position of the sensor holder 20, while viewing the indexes 61 and the positioning holes 31a of the sensor holder 20 from the side of the opening 21a.

To this end, the sensor board 16 to which the imaging sensor package 15 has been soldered is first fixed to a jig (not shown). Next, the sensor holder 20 is placed on the sensor package 15 in such a manner that the front wall rear surface 21b of the sensor holder body 21 is in contact with the front surface 35a of the frame 35 of the sensor package 15. Then, a left-right direction adjustment unit 63 and an up-down direction adjustment unit 64 are operated to move the sensor holder 20 relative to the sensor board 16 in such a manner that distances 62 between the indexes 61 and the positioning holes 31a of the flange portions 31 of the sensor holder 20 fall within predetermined ranges, as seen from the side of the opening 21a of the sensor holder body 21. It should be noted that the adjustment units 63, 64 are e.g. ordinary micrometer heads that are capable, when operated, of moving the sensor holder 20 in units of micrometers.

After the sensor holder 20 is positioned relative to the imaging sensor package 15 soldered to the sensor board 16 as described above, the adhesive 41 is applied to the side surfaces of the sensor holder body 21 and to the sensor board 16 and is then cured. At that time, by using e.g. instant adhesive or adhesive curable by ultraviolet light irradiation, the sensor holder 20 and the sensor board 16 can easily be adhered together while maintaining the positional relation between the sensor holder 20 and the imaging sensor package 15.

Although a case where the present invention is applied to a digital video camera has been described in the above embodiment, the present invention is also applicable to a digital still camera, monitoring camera, drive recorder, portable information terminal, etc.

While the present invention has been described with reference to an exemplary embodiment, it is to be understood that the invention is not limited to the disclosed exemplary embodiment. The scope of the following claims is to be accorded the broadest interpretation so as to encompass all such modifications and equivalent structures and functions.

This application claims the benefit of Japanese Patent Application No. 2011-207292, filed Sep. 22, 2011, which is hereby incorporated by reference herein in its entirety.

What is claimed is:

1. An image pickup apparatus comprising:
   an imaging sensor package;
   a circuit board on which the imaging sensor package is mounted;
   a heat radiation member disposed on a side of the circuit board opposite from a side thereof on which the imaging sensor package is mounted;
   a holder member disposed in front of the imaging sensor package and configured to hold the imaging sensor package; and
   a fixture member disposed in front of the holder member and configured to be fixed with the heat radiation member,
   wherein the imaging sensor package and the circuit board are sandwiched between the holder member and the heat radiation member,
   wherein the holder member is positioned to the fixture member,
   wherein the holder member has a holder body which surrounds at least a peripheral side of the imaging sensor package and a flange portion formed integrally with the holder body, and
   wherein the flange portion projects from the holder body toward the heat radiation member, and
   wherein the holder member is adhered to the circuit board by adhesive applied across a part of the holder body where the flange portion is not formed and a surface of the circuit board where the imaging sensor package is mounted.

2. The image pickup apparatus according to claim 1, wherein a gap is provided between the holder body and the circuit board such that the holder body is not in contact with the circuit board, and wherein the holder body has a groove into which the adhesive flowing into inside of the holder body is guided.

3. The image pickup apparatus according to claim 1, wherein a cut out portion is formed at a portion of the circuit board that faces the flange portion, and
   wherein the flange portion extending through the cut out portion is in contact with the heat radiation member.

4. The image pickup apparatus according to claim 1, wherein a signal processing IC is mounted on the side of the circuit board opposite from the side thereof on which the imaging sensor package is mounted, and
   wherein the signal processing IC and the heat radiation member are thermally connected with each other.

5. The image pickup apparatus according to claim 1, wherein a screw insertion hole is formed in the heat radiation member and in the flange portion in an optical axis direction,
   wherein a threaded screw hole for thread engagement with screw that is inserted through the screw insertion hole is formed in the fixture member in the optical axis direction and in alignment with the screw insertion hole, and
   wherein the threaded screw hole is provided within ranges from abutment surface between the flange portion and the fixture member to a front end surface of the holder member.

6. The image pickup apparatus according to claim 1, wherein the imaging sensor package has an image sensing device, and
   wherein the fixture member is a lens barrel in which there is disposed an imaging optical system configured to form an object image on the image sensing device.

7. The image pickup apparatus according to claim 1, wherein a first positioning portion is provided on the flange portion,
   wherein a second positioning portion is provided on the fixture member, and
   wherein the holder member is positioned to the fixture member by engaging the first and second positioning portion with each other.

* * * * *